United States Patent
Chiarenza

[15] 3,680,249
[45] Aug. 1, 1972

[54] ARTIFICIAL FISHING LURE

[72] Inventor: Melchior S. Chiarenza, 15 Grassy Pond, Smithtown, N.Y. 11787

[22] Filed: Aug. 20, 1970

[21] Appl. No.: 65,529

[52] U.S. Cl. .................43/42.06, 43/42.28, 43/42.5, 43/43.13
[51] Int. Cl. ..............................................A01k 85/00
[58] Field of Search.......43/42.28, 42.06, 42.5, 43.13

[56] References Cited

UNITED STATES PATENTS 2,812,609    11/1957    Lema..........................43/42.28
3,570,167    3/1971    Smith..........................43/42.06

Primary Examiner—Samuel Koren
Assistant Examiner—Daniel J. Leach
Attorney—James A. Conner

[57] ABSTRACT

An artificial fishing lure having a centrally and longitudinally weighted body section with side fins thereon and a resilient tail section secured thereto wherein the weight and fins stabilize the lure when the drawn through the water in a linear forward motion and the tail section undulates horizontally and vertically to simulate the swimming action of a bait fish.

3 Claims, 5 Drawing Figures

PATENTED AUG 1 1972 3,680,249

INVENTOR.
MELCHIOR S. CHIARENZA
BY James A. Conner

AGENT

ARTIFICIAL FISHING LURE

This invention relates generally to fishing lures and more particularly to a fishing lure that simulates the normal swimming characteristics of bait fish.

Heretofore, fishing lures have been directed toward appearance and configuration similarities to those of bait fish rather than the present novel action that occurs as the lure is drawn through the water.

The art of fishing with artificial lures is well known to those skilled in the art and may briefly be described as follows:

The artificial lure is attached to a fishing line emanating from a reeling device mounted on a fishing pole. The lure is either cast into the water or trolled from a boat, and retrieved by the reeling device. During the retrieval process, the action and appearance of the lure simulates bait fish and, theoretically, attracts larger fish thereto.

Basically, there are two general categories of artificial lures. One category is the surface lure which, in effect, floats on or is disposed adjacent to the surface of the water due to buoyancy or to the shape of the lure or extraneous members that urge the lure upwardly as the lure is drawn through the water. The second category refers to sinking or underwater lures that operate at various depths to attract fish that normally inhabit such depths. The present invention is directed toward a lure that falls within the second category.

The present invention comprises an artificial lure adapted to be drawn through water having a unique weighted body formed to provide a discharge current at its rear terminal area that co-acts with an appended resilient tail member to produce a horizontal and vertical tail undulating motion that simulates the normal undulating motion of a swimming bait fish.

Accordingly, one of the principal objects of the invention resides in an artificial fishing lure body member having an appended resilient tail section, and said body member haVing integral means to indirectly control the movement of said tail section in a predetermined manner as said body and tail section is drawn through water.

Another object of the invention resides in an artificial lure having a body member including means to secure a line to one end thereof and means to secure a combined semi-rigid and flexible tail portion to the other end thereof.

Yet another objects is to provide an artificial lure including a fixed body member having a central keel and oppositely disposed angularly extending stabilizing fins integrally formed therein.

Other ancillary objects will be, in part, hereinafter apparent and will be, in part, hereinafter pointed out.

IN THE DRAWING

Figure 1:
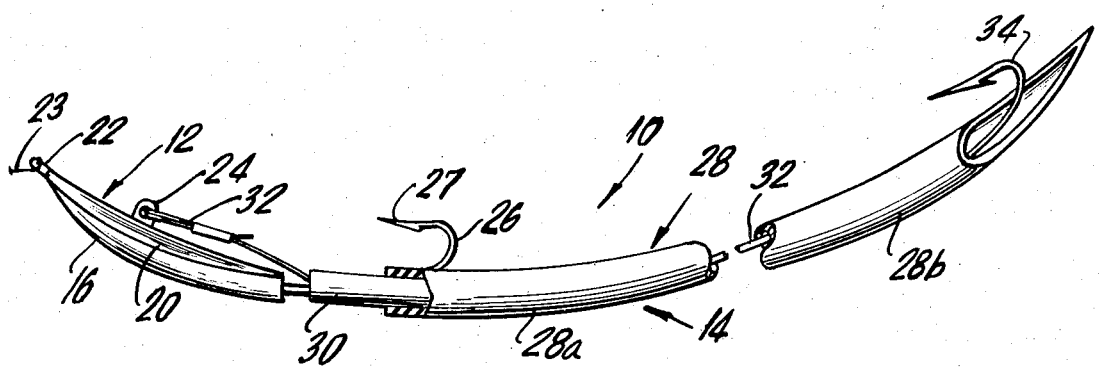
FIG. 1 is a side elevation of the artificial lure.

Referring to the drawing in detail, 10 generally designates an artificial lure comprising a body member 12 and a flexible tail portion 14.

Body member 12 comprises an arcuately molded lead or tin block having an integrally formed longitudinal keel section 16 and a pair of oppositely extending wing sections 18 and 20, respectively. An eyelet 22 is integrally formed within the leading forward terminal portion to which a conventional fishing line 23 may be attached. Secured to and extending upwardly from the arcuate surface of the member 12 is a ring 24, provided for a purpose hereinafter described. Integrally molded within the body member 12 and rearwardly extending therefrom is a hook 26. The hook 26 is disposed to extend from the central portion of the rear terminal of body 12 with the barbed end 27 positioned perpendicular to the body 12.

Adapted to be secured to the hook 26 is the tail section 14 which comprises a length of hollow resilient tubing 28 formed of a latex or other flexible rubber composition material having a predetermined inside dimension. Disposed within the tubing 28 is a smaller dimension tubing 30 formed of a similar resilient composition. The outside dimension of tubing 30 is such as to fit snugly in tubing 28. Tubing 30 is disposed circumjacent on the rearwardly extending shank portion of hook 26. Tubing 28 is disposed circumjacent on tubing 30 with the barbed portion of hook 26 projecting through both tubing 30 and tubing 28 to substantially secure tubing 38 to the tubing 30. The tubing 30 extends rearwardly and lies within a portion 28a of tubing 28. In addition to providing mounting means for the length of tubing 28, tubing 30 effectively plugs or seals the orifice or opening at the leading edge of the length of tubing 28 for a purpose hereinafter apparent.

Adapted to be secured to ring 24 is a flexible wire leader 32 that is disposed adjacent to the shank of hook 26 and extends through the hollow tubing 30 and the hollow tubing 28. Leader 32 is secured to a hook 34 that extends from the rear terminal section of tubing 28. It will be noted that the rear terminal section of tubing 28 is cut diagonally in vertical relation to the longitudinal axis of the tubing 30 and 28 for a purpose hereinafter described. Further, it will be evident from FIG. 1, that the length of tubing 28 possesses an inherent curling tendency resulting from the tubing length 28 being cut from a coil of tubing, not shown. When assembled, as hereinbefore described, tubing 28 curls upwardly, as shown in FIG. 1.

Figure 2:
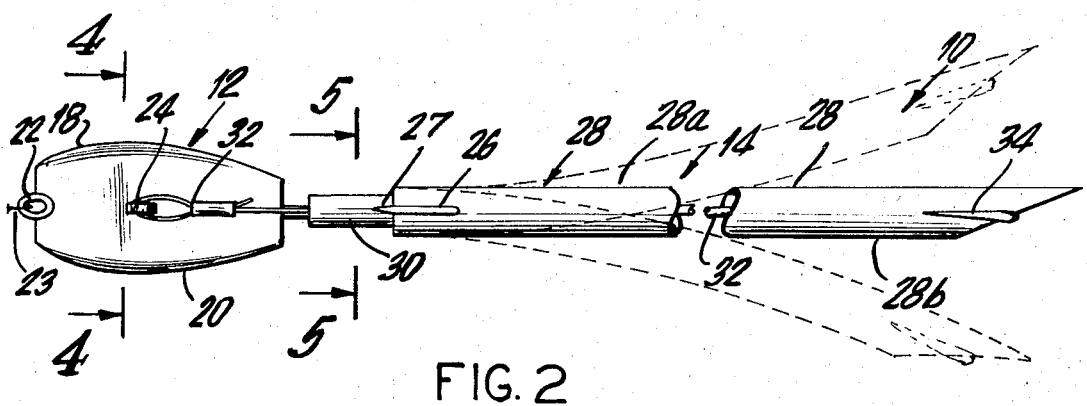
FIG. 2 is a plan elevation with portions of the tail piece cut away to illustrate the connecting rear hook leader.
Figure 3:
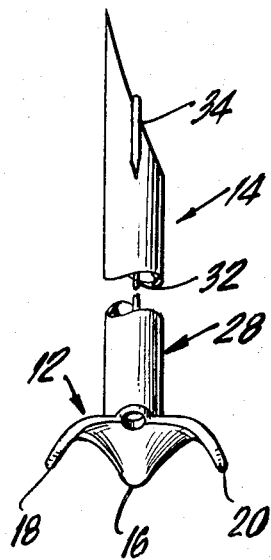
FIG. 3 is a front view illustrating the formation of the lower side of the weighted body.
Figure 4:
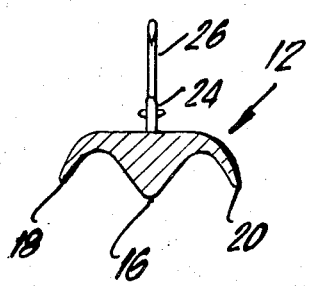
FIG. 4 is a cross-sectioned view taken along line 4—4 of FIG. 2.
Figure 5:
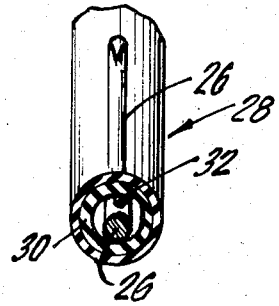
FIG. 5 is a cross-sectioned view taken along line 5—5 of FIG. 2.

In operation, the lure 10, secured to a line 23, may be cast into the water and retrieved or may be trolled from a moving boat. In either instance, the lure 10 is drawn through the water whereby the arcuate configuration presents the underside of the body member 12 in engagement with the water per se. The outwardly extending wing sections 18 and 20 produce a pair of balanced tunnels through which the water flows and thereby creates a lifting effect that counteracts the normal sinking tendency of the weighted body 12. The speed of movement of body 12 determines the water depth that the lure 10 will effectively remain at. The balance relationship of wings 18 and 20 to the central keel 16 guides body 12 in a substantially linear movement through the water. However, hollow rear section 28b of flexible tail section 28 with the diagonally cut rear portion, when drawn through the water creates a suction that introduces motion to the flexible tail section 14 to alternately move horizontally from one side to the other, such as shown in dotted lines in FIG. 2. Simultaneously, the inherent upward curl of the tubing 28 causes a vertically upwardly and downwardly movement of the tail section 14. This vertical oscillating movement is a combination of the forces of the friction of the water and the inherent curling tendency of the tubing.

Thus the various components of the artificial lure 10 simulate the principal elements and motions of a swimming bait fish. For example, the body 12 simulates the linear motion of the forward portion of a fish while the tail section 14 simulates the horizontal and vertical movements of the tail of a fish swimming through the water.

While but a single embodiment of the invention has been shown and described, it will be understood that modifications and changes could be made without departing from the scope of the invention as set forth in the following claims.

The invention claimed is:

1. A fishing lure adapted to be secured to a fishing line and drawn through water to simulate the swimming motions of a bait fish comprising
   a. an arcuate body member having a substantially flat inner surface,
   b. a centrally disposed longitudinally extending keel formed on the outer surface of said body member,
   c. a pair of oppositely extending wings formed on the outer surface of said body member, each of said wings being disposed in equidistant spaced relation from said keel,
   d. said wings and keel shaped to form a pair of tunnel-like passages to stabilize the body member when said body member is drawn through water,
   e. a hook having a shank secured to and rearwardly extending from said body member,
   f. resilient hollow tubing means secured to said hook shank adapted to oscillate vertically and horizontally relative to the direction of movement of said body member as said body member and tubing means is drawn through the water whereby said tubing means simulates the tail motion of a swimming bait fish,
   g. and means to plug the one end of the tubing means secured to said hook shank to prevent water from flowing through the secured end and into said tubing means.

2. In a lure as set forth in claim 1,
   a. and the other end of said tubing means terminating in a vertical angular cut relationship whereby the terminating end of a portion of the tubing wall extends beyond the terminating end of the diametrically opposite side wall portion,
   b. and said other end of the tubing means being open to create a suction effect at the terminating end of the tubing means as said lure is drawn through the water whereby the suction effect and the angular terminal cut cooperate to horizontally oscillate the terminal portion of the resilient means.

3. In a lure as set forth in claim 2,
   a. and said tubing means being provided with an inherent curling tendency that urges the terminal portion of the tubing means upwardly and the movement of the lure being drawn through the water reduces the curling tendency and effectively vertically oscillates the tubing means.

* * * * *